United States Patent
Dorogusker et al.

(10) Patent No.: US 8,170,623 B2
(45) Date of Patent: May 1, 2012

(54) CHARGING ARRANGEMENT FOR ELECTRONIC ACCESSORIES

(75) Inventors: Jesse Dorogusker, Menlo Park, CA (US); Donald Joseph Novotney, San Jose, CA (US); Nicholas Robert Kalayjian, San Carlos, CA (US); John G. Tang, San Carlos, CA (US); Emery Sanford, San Francisco, CA (US); Evans Hankey, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1529 days.

(21) Appl. No.: 11/601,361

(22) Filed: Nov. 17, 2006

(65) Prior Publication Data

US 2008/0119241 A1    May 22, 2008

(51) Int. Cl.
*H04M 1/00* (2006.01)
(52) U.S. Cl. .................... 455/573; 455/569.1; 455/569.2
(58) Field of Classification Search .................. 455/573, 455/569.1, 569.2
See application file for complete search history.

(56) References Cited

U.S. PATENT DOCUMENTS

| | | | | |
|---|---|---|---|---|
| 6,078,825 | A | * | 6/2000 | Hahn et al. .................. 455/569.2 |
| 2005/0143149 | A1 | * | 6/2005 | Becker et al. ............... 455/575.1 |
| 2006/0019718 | A1 | * | 1/2006 | Kuo ........................... 455/569.1 |
| 2007/0054550 | A1 | * | 3/2007 | Cuthbert et al. .............. 439/607 |

FOREIGN PATENT DOCUMENTS

| | | |
|---|---|---|
| EP | 1 326 410 | 7/2003 |
| EP | 1505801 A | 2/2005 |
| GB | 2416953 A | 2/2006 |

OTHER PUBLICATIONS

"International Preliminary Report on Patentability", Issued in PCT Application No. PCT/US2007/084726; Mailing Date: May 28, 2009.
"International Search Report", Issued in PCT Application No. PCT/US2007/084726; Mailing Date: Jul. 11, 2008.
"Written Opinion", Issued in PCT Application No. PCT/US2007/084726; Mailing Date Jul. 11, 2008.

* cited by examiner

*Primary Examiner* — Charles Appiah
*Assistant Examiner* — Alexander Yi
(74) *Attorney, Agent, or Firm* — David C. Kellogg (57) ABSTRACT

An arrangement for charging an electronic accessory (such as a wireless headset) using a docking station that obtains power from at least one of a power port and a data port of an attached electronic device (such as the pairing cellular phone). The docking station provides mechanical support and a convenient storage arrangement for the electronic accessory, as well as power conditioning. In another embodiment, the charging and storage functions for the electronic accessory are provided by a cigarette lighter plug employed to charge the electronic device.

5 Claims, 6 Drawing Sheets

CHARGING ARRANGEMENT FOR ELECTRONIC ACCESSORIES

BACKGROUND OF THE INVENTION

Figure 1A:
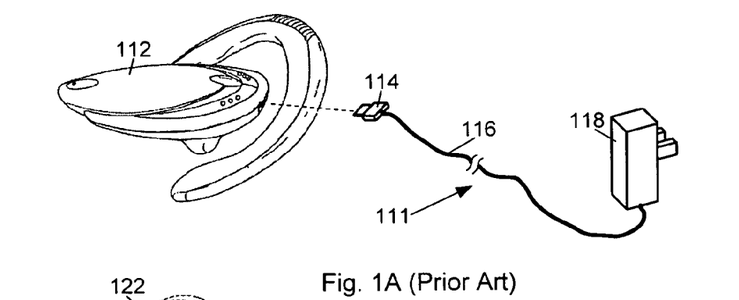
FIGS. 1A-C show conventional charging arrangements for charging wireless headsets.
Figure 1B:
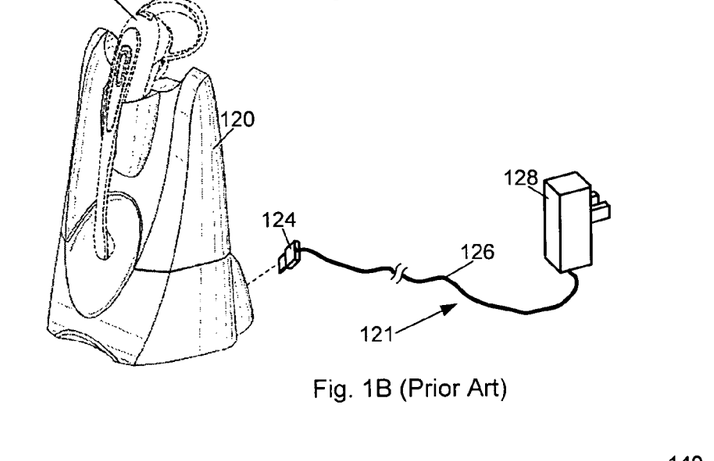
Figure 1C:
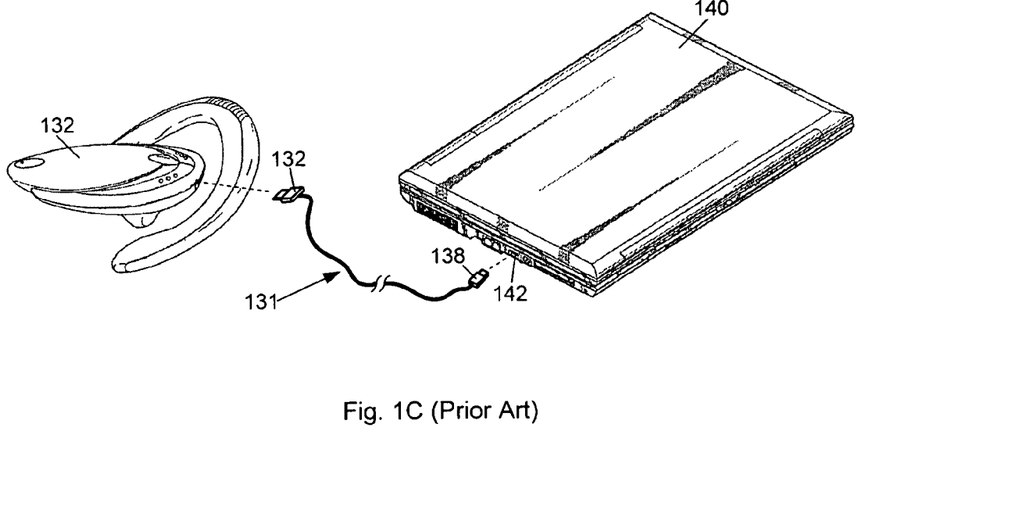

Portable electronic devices such as cellular phones may be used with detachable or wireless electronic accessories such as wireless headsets. Such electronic accessories typically need to be charged in order to have sufficient power for normal operation. FIGS. 1A-C show conventional arrangements for charging wireless headsets.

FIG. 1A shows an example conventional arrangement in which a headset 112 is charged through a charger 111. Charger 111 includes, for example, a connector 114 to be plugged into headset 112, an AC adapter 118 to be plugged into a wall outlet (or an outlet of an extension cable connected to a wall outlet), and a cable 116 connecting connector 114 and AC adapter 118.

In such an arrangement, it is not possible to charge headset 112 when there is no wall outlet nearby, such as when a user of headset 112 is riding a car, or when the user does not carry charger 111 with him/her. Further, after charging headset 112 at a certain wall outlet, a user of headset 112 is typically required to return to the location of the wall outlet to pick up headset 112 and charger 111. Therefore, much inconvenience, inflexibility, and immobility may be involved in such an arrangement. Still further, AC adapter 118 may be bulky, and cable 116 may be long and prone to tangle. As such, it is typically inconvenient for the user to carry and to handle charger 111, in addition to carrying and handling another charger for a cellular phone with which headset 112 pairs and works.

FIG. 1B shows another example conventional arrangement in which a headset 122 is charged through a charger 121 and a cradle 120. Charger 121 includes, for example, a connector 124 to be plugged into cradle 120, an AC adapter 128 to be plugged into a wall outlet (or an outlet of an extension cable connected to a wall outlet), and a cable 126 connecting connector 124 and AC adapter 128. Cradle 120 includes, for example, a port to receive connector 124, conductive contacts to transmit power to headset 122, and appropriate structural components to mechanically support headset 122 while disposed in cradle 120.

Such an arrangement may provide mechanical support and protection for headset 122 during charging. However, such an arrangement again limits the charging of headset 122 to locations near a wall outlet. Further, cradle 120 represents another bulky component that requires the user to carry and handle if the user wishes to charge headset 122 while away from home.

FIG. 1C shows still another example conventional arrangement in which headset 132 is charged by a computer 140 through a USB cable 131. USB cable 131 includes, for example a USB connector 138 to be plugged into a USB port 142 of computer 140, and a connector 132 to be plugged into headset 132. When connected with headset 132, computer 140 first establishes a host-client relationship with headset 132 and then transmits power to headset 132. In such a USB host/client pairing, a USB host and a USB client are typically required, with computer 140 performing the function of the USB host and headset 132 performing the function of the USB client in the example of FIG. 1C.

In such an arrangement, headset 132 cannot be charged when there is no available USB host device such as computer 140 nearby. Further, a USB host device such as computer 140 typically needs to be turned on in order to establish a host-client relationship with headset 132, and a headset 132 user may be required to wait a significant amount of time for the USB host device to turn on. Still further, if a user charges headset 132 at a USB host device that is not portable or not carried with the user, the user is typically required to return to the USB host device to pick up headset 132. If no USB host is available, headset 132, which assumes the role of a USB client in receiving charge from another device in the example of FIG. 1C, cannot be charged. Therefore, much inconvenience may be involved in such an arrangement.

SUMMARY OF INVENTION

The invention relates, in an embodiment, to a charging arrangement for an electronic accessory to a portable electronic device. The arrangement includes a docking station configured to be coupled with at least one of a power port and a data port of the portable electronic device. The docking station includes a first docking station port having first set of docking station pins for electrically coupling with pins of the at least one of the power port and the data port of the portable electronic device. The docking station also includes an accessory charging port having recess portion adapted to provide mechanical support to the electronic accessory when the electronic accessory is coupled to the docking station to be charged. The docking station further includes a second set of docking station pins configured to electrically couple with pins disposed on the electronic accessory, wherein the electronic accessory is charged by power provided by the portable electronic device through the first set of docking station pins.

In another embodiment, the invention relates to a charging arrangement for an electronic accessory to a portable electronic device. The arrangement includes a plug body having a first end configured to be plugged into a cigarette lighter power port. The arrangement further includes a first set of conductors configured to provide power to the portable electronic device for charging the portable electronic device. The arrangement also includes an accessory charging port disposed at least partially within the plug body, the accessory charging port being configured to mechanically receive the electronic accessory when the electronic accessory is plugged into the accessory charging port for charging. The arrangement additionally includes a first set of charging pins disposed at least partially within the accessory charging port for providing power to the electronic accessory when the electronic accessory is plugged into the accessory charging port for charging In another embodiment, the invention relates to a cellular phone system that includes a cellular phone having a first speaker, a first microphone, and cellular phone battery. The cellular phone system also includes a detachable headset comprising at least a second speaker, a second microphone, and a headset battery. The cellular phone system further includes a detachable docking station configured to be coupled with at least one of a power port and a data port of the cellular phone. The docking station includes a first docking station port having first set of docking station pins for electrically coupling with pins of the at least one of the power port and the data port of the cellular phone. The docking station also includes an accessory charging port having recess portion adapted to provide mechanical support to the headset when the headset is coupled to the docking station to be charged. The docking station further includes a second set of docking station pins configured to electrically couple with pins disposed on the headset, wherein the headset is charged by power provided by the cellular phone through the first set of docking station pins, wherein the docking station is configured to be detachably coupled with the cellular phone and wherein the detachable headset is configured to be detachably coupled with the docking station.

These and other features of the present invention will be described in more detail below in the detailed description of the invention and in conjunction with the following figures:

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

One or more embodiments of the present invention involve charging arrangements for charging electronic accessories. An embodiment includes a docking station (or an intermediary device) that connects an electronic accessory and a portable electronic device such that the electronic accessory may receive power from the portable electronic device through the docking station. In an embodiment, the docking station includes electronic circuitry configured to condition and to control the power received by the portable electronic accessory.

Further, in an embodiment, the docking station includes a recess portion configured to provide mechanical support for and storage of the electronic accessory. As such, the electronic accessory is protected from potential damage and is located with the electronic device for convenient use.

Another embodiment includes a charger configured to connect both the electronic accessory and the portable electronic device to a power source. Accordingly, the charger is capable of simultaneously charging both of the electronic accessory and the electronic device. In an embodiment, the charging power comes from a cigarette lighter power port of an automobile.

Further, in the embodiment, the charger includes a recess portion configure to provide mechanical support and storage of the electronic accessory.

In an embodiment, the electronic accessory is a wireless headset, and the portable electronic device represents a portable communication device such as a cellular phone.

The features and advantages of the present invention may be better understood with reference to the figures and discussions that follow.

Figure 2:
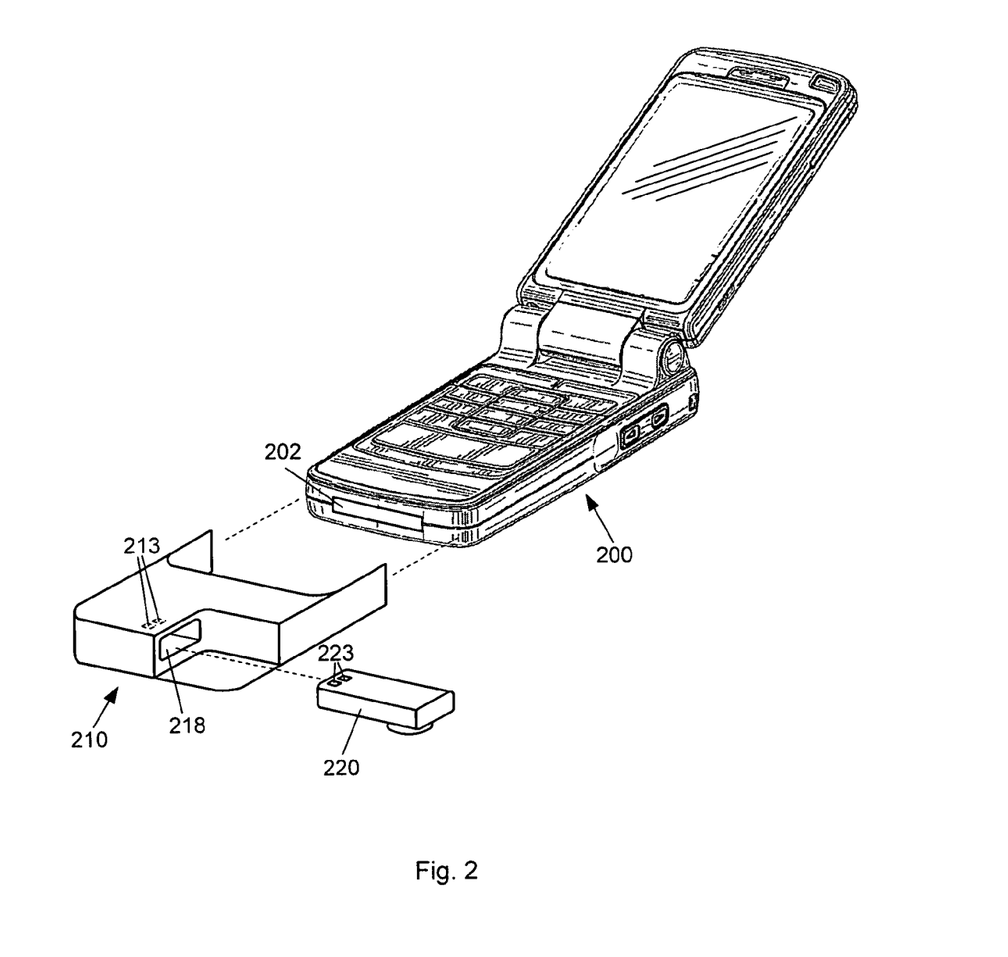
FIG. 2 shows, in accordance with one or more embodiments of the present invention, a charging arrangement for charging a wireless headset.

FIG. 2 shows, in accordance with one or more embodiments of the present invention, a charging arrangement for charging a wireless headset 220. Wireless headset 220 represents an electronic accessory usually used in conjunction with a portable electronic device, which is represented by a cellular phone 200. Wireless headset 220 includes one or more transducers for conversion between audible sounds and electrical signals. For example, wireless headset may include a microphone and/or an earphone.

As shown in FIG. 2, the charging arrangement includes a docking station 210. Docking station 210 is configured to be coupled with cellular phone 200. In the example of FIG. 2, docking station 210 is configured to conform to the form factor or the shape of an end of cellular phone 200. In an embodiment, docking station 210 is configured to be attached to one end of cellular phone 200. In an embodiment, docking station 210 includes a docking station port (not seen in the perspective angle of FIG. 2) configured to electrically couple with interface 202 of cellular phone 200. Alternatively or additionally, docking station 210 may include a short cable configured to be coupled with interface 202 as well as a latching mechanism for removably securing docking station 210 onto cellular phone 200. Through interface 202, docking station may receive power from the battery and/or a charging circuit of cellular phone 200.

As further shown in FIG. 2, docking station 210 includes a recess portion 218 adapted to capture and mechanically support at least a portion of wireless headset 220. Recess portion 218 may provide protection and convenient storage for wireless headset 220, thereby solving prior art storage and protection problems involving using wireless headsets.

For example, wireless headsets are typically disposed in ways that may expose them to risks of loss or damage, given typical delicacy and fragility of the wireless headsets. Specifically, headset users may wear wireless headsets on their ears, hang wireless headsets on their chests using lanyards, or dispose wireless headsets in their pockets or purses. As a result, the wireless headsets may be prone to drop from the ears or pockets or to collide with hard objects such as, for example, a desk in front of a user's chest or keys in a user's purse. Further, wearing the wireless headset during face-to-face conversations may be considered improper manner. By storing wireless headset 220 using recess portion 218, a user may avoid the storage and protection problems.

Inside recess portion 218, docking station 210 includes pins 213 (i.e., conductive contacts) configured to electrically couple with pins 223 disposed on wireless headset 220. When wireless headset 220 is plugged into recess portion 218, docking station 210 may receive power from cellular phone 200 and transmit the power, through pins 213 and 223, to wireless headset 220, thereby charging wireless headset 220. Alternatively or additionally, the power coupling between docking station 210 and headset 220 may be accomplished using a charging approach that does not involve actual mechanical contact of electrically conductive pins, e.g., via magnetic coupling.

In accordance with one or more embodiments of the present invention, when docking station 210 is coupled to cellular phone 200 and wireless headset 220 is plugged into docking station 210, a pairing relationship between cellular phone 200 and wireless headset 220 is automatically established without a manual configuration process.

Figure 3:
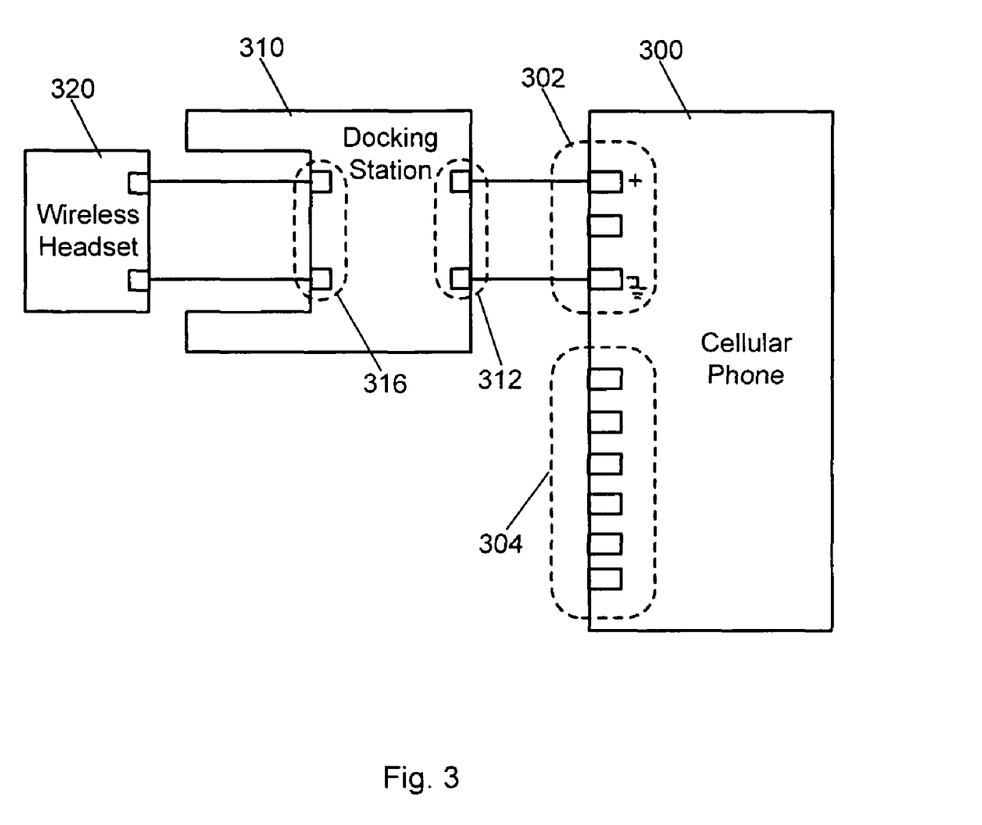
FIG. 3 shows, in accordance with one or more embodiments of the present invention, a block diagram of a charging arrangement for charging a wireless headset with power from a cellular phone.

FIG. 3 shows, in accordance with one or more embodiments of the present invention, a simplified block diagram of a charging arrangement for charging a wireless headset 320 with power from a cellular phone 300. Cellular phone 300 includes a power port 302 and a data port 304, wherein power port 302 is used in the charging arrangement. The charging arrangement includes a docking station 310. Docking station 310 includes docking station port 312, which includes pins (or conductive contacts) configured to electrically couple with pins of power port 302, for receiving power from cellular phone 300. Typically, power ports of cellular phones only receive input, but do not provide output. Contrarily, in accordance with one or more embodiments of the present invention, power port 302 is adapted to provide output from the battery of cellular phone 300 or from the charging circuitry in cellular phone 300. In accordance with one or more such embodiments, docking station 310 further includes electronic circuitry configured to cause cellular phone 300 to enter a state (e.g., by sending a signal via a data pin of data port 304 or a power pin of power port 302) whereby power from a battery in cellular phone 300 is present on at least one pin of power port 302.

Docking station 310 further includes an accessory charging port 316, which includes pins configured to electrically couple with pins disposed on wireless headset 320, for transmitting power from cellular phone 300 to wireless headset 320. As such, wireless headset 320 may be charged with power from cellular phone 300 through docking station 310.

Figure 4:
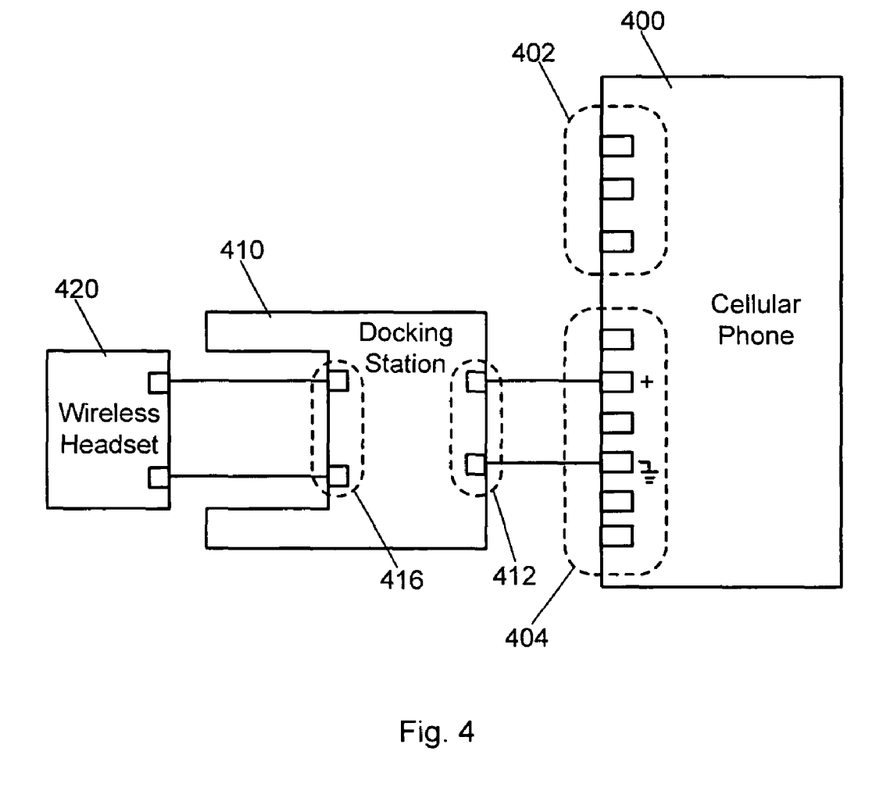
FIG. 4 shows, in accordance with one or more embodiments of the present invention, a block diagram of a charging arrangement for charging a wireless headset with power from a cellular phone.

FIG. 4 shows, in accordance with one or more embodiments of the present invention, a block diagram of a charging arrangement for charging a wireless headset 420 with power from a cellular phone 400. Cellular phone 400 includes a power port 402 and a data port 404, wherein data port 404 is used in the charging arrangement. The charging arrangement includes a docking station 410. Docking station 410 includes a first set of docking station pins 412 configured to electrically couple with pins of data port 404, for receiving power from cellular phone 400. In accordance with one or more such embodiments, docking station 410 further includes electronic circuitry configured to cause cellular phone 400 to enter a state (e.g., via a signal provided to one or more pins of power port 402 and/or data port 404) whereby power from a battery in cellular phone 400 is present on at least one pin of data port 404.

Docking station 410 further includes a second set of docking station pins 416 configured to electrically couple with pins disposed on wireless headset 420 for transmitting power from cellular phone 400 to wireless headset 420. As such, wireless headset 420 may be charged with power from cellular phone 400 through docking station 410.

Figure 5:
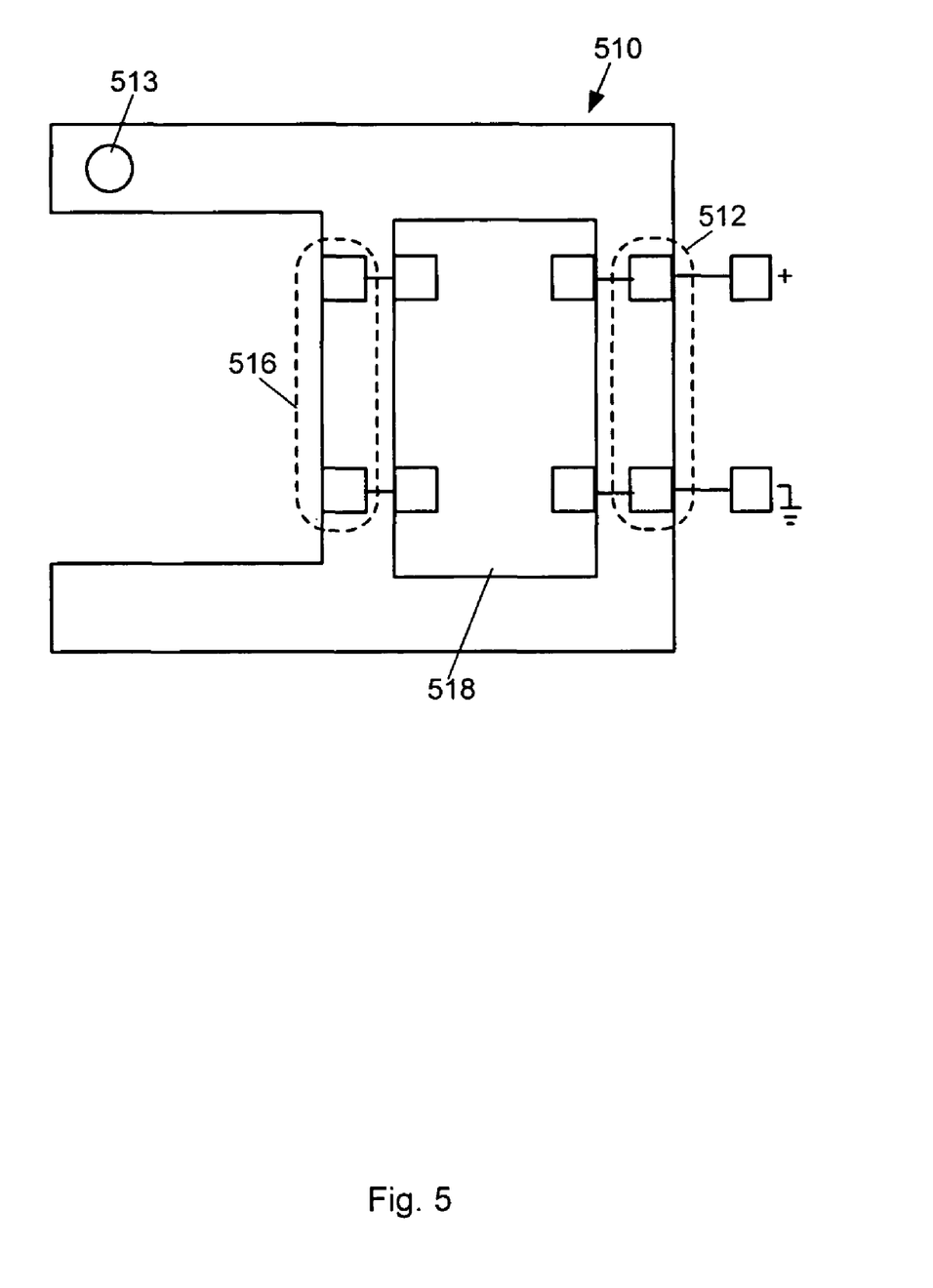
FIG. 5 shows, in accordance with one or more embodiments of the present invention, a schematic representation of a docking station for charging a wireless headset.

FIG. 5 shows, in accordance with one or more embodiments of the present invention, a schematic representation of a docking station 510 for charging a wireless headset. Docking station 510 includes an accessory interface 516 configured to electrically couple with the wireless headset and a cellular phone interface 512 for electrically coupling with a cellular phone. Between accessory interface 516 and cellular phone interface 512, docking station 510 includes electronic circuitry 518 configure to perform power conditioning and actions based on a set of logic.

The power conditioning may include one or more of charge regulation, voltage translation, static resolution, and current limiting. A trickle charge function may be provided to trickle charge the wireless headset after the wireless headset is fully charged or is close to being fully charged. The trickle charge may be associated with a trickle current that is lower than a charging current employed to charge the wireless headset when the wireless headset is complete discharged or significantly discharged.

The logic may include rules governing conditions of starting and stopping charging the wireless headset. For example, electronic circuitry 518 may be configured to monitor a charge level of a battery of the cellular phone and to stop the charging when the charge level of the cellular phone battery decreases below a certain threshold. Electronic circuitry 518 may also be configured to detect the presence of the wireless headset to begin charging. In this case, if no headset is detected, power is not provided to pins 516 (e.g., via a tri-stating logic circuitry or other suitable power-disconnect circuitry) even if docking station 510 is coupled to the cellular phone in order to prevent accidental shorting between individual ones of pins 516.

Docking station 510 may further include an indicator 513 for indicating status of the charging. The status may include one or more of, for example, the charging is in progress, the charging is completed, and the charging is aborted (such as when the above-mentioned threshold is reached). The indicator may be implemented by, for example, a LED (light emitting diode) that may provide different colors, different levels of intensity, and/or different flashing sequences to represent various conditions.

Figure 6:
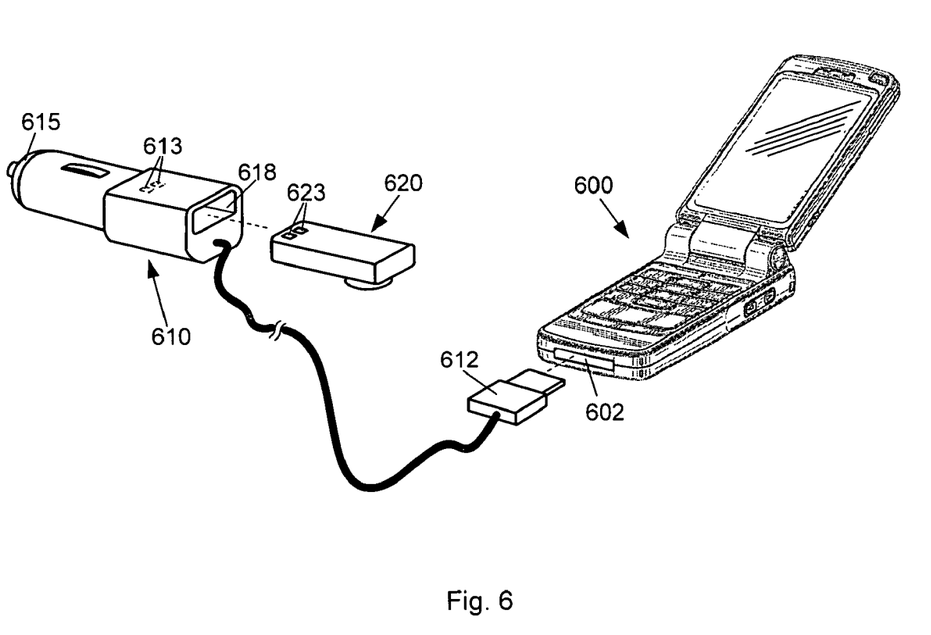
FIG. 6 shows, in accordance with one or more embodiments of the present invention, a cigarette lighter charger for charging a wireless headset.

FIG. 6 shows, in accordance with one or more embodiments of the present invention, a cigarette lighter charger 610 for charging a wireless headset 620. Cigarette lighter charger 610 includes a plug end 615 configured to be plugged into a cigarette lighter power port, for example in an automobile, for obtaining power.

Cigarette lighter charger 610 further includes a connector 612 configured to electrically couple to an interface 602 of cellular phone 600. When plug end 615 is plugged into a cigarette lighter power port and connector 612 is coupled with interface 602, cellular phone 600 may be charged with power received from the cigarette lighter power port through conductors of connector 612.

Further, cigarette lighter charger 610 includes an accessory charging port 618. Accessory charging port 618 is configured to mechanically receive and support at least a portion of wireless headset 620. Inside accessory charging port 618, cigarette lighter charger 610 includes charging pins 613 for electrically coupling pins 623 in order to provide power to wireless headset 620. When wireless headset 620 is plugged into accessory charging port 618 and plug end 615 is plugged into a cigarette lighter power port, wireless headset 620 may receive power from the cigarette lighter power port for charging. Alternatively or additionally, the power coupling between cigarette lighter charger 610 and headset 620 may be accomplished using a charging approach that does not involve actual mechanical contact of electrically conductive pins, e.g., via magnetic coupling.

In accordance with one ore more embodiments of the present invention, cigarette lighter charger 610 further includes regulation circuitry. The regulation circuitry may perform power conditioning before the power from a cigarette lighter power port is received by wireless headset 620 and cellular phone 600, respectively. The regulation circuitry may also perform power conditioning before the power from cellular phone 600 is received by wireless headset 620.

As can be appreciated from the foregoing, embodiments of the present invention provide convenient arrangements for charging electronic accessories such as wireless headsets.

Through docking stations in accordance with one or more embodiments of the present invention, wireless headsets may be charged as long as their pairing cellular phones are present and are charged. Since the wireless headsets alone are useless, users are very likely to have the pairing cellular phones with them whenever they would like to charge the wireless headsets. A user may no longer be required to be near a wall outlet or a USB host device for charging a wireless headset.

Further, the user may need only one cellular phone charger without the need and burden of an additional headset charger. As such, the down time of the wireless headsets may be minimized. One or more embodiments of the present invention further enable an optimal allocation of charge between a wireless headset and a cellular phone to enable operation of both devices. As such, usability of both of the wireless headset and the cellular phone may be maximized, since the wireless headset is useless without the cellular phone, and use of the cellular phone may be banned without use of a hands free device, for example, during driving. One or more embodiments of the present invention also provide secure and convenient storage for a wireless headset. As such, the wireless headset may be protected from potential damage and loss, and may be easily available when a phone call is to be answered or made.

While this invention has been described in terms of several embodiments, there are alterations, permutations, and equivalents, which fall within the scope of this invention. It should also be noted that there are many alternative ways of implementing the methods and apparatuses of the present invention. The abstract is provided herein for convenience and is not intended to be used to construe or limit the claims. It is therefore intended that the following appended claims be interpreted as including all such alterations, permutations, and equivalents as fall within the true spirit and scope of the present invention.

What is claimed is:

1. A charging arrangement for an electronic accessory to a portable electronic device, comprising:
   a vertically un-adjustable plug body having a first end configured to be plugged into a cigarette lighter power port;
   a first set of conductors within said plug body configured to provide power to said portable electronic device for charging said portable electronic device directly via a continuous wire;
   an accessory charging port disposed partially within said plug body, said accessory charging port being configured to mechanically, by partially enclosing, laterally receive said electronic accessory when said electronic accessory is plugged into said accessory charging port for charging; and
   a first set of charging pins disposed at least partially within said accessory charging port for providing power to said electronic accessory when said electronic accessory is plugged into said accessory charging port for charging, wherein said plug body includes a first regulation circuit configured to at least adapt a first voltage level present on said cigarette lighter power port to a second voltage level suitable for charging said electronic accessory, said plug body further includes a second regulation circuit configured to at least adapt said first voltage level present on said cigarette lighter power port to a third voltage level suitable for charging said portable electronic device, wherein said second voltage level is different from said third voltage level and both said second voltage level and said third voltage level being different from a ground voltage level.

2. The charging arrangement of claim 1 wherein said electronic accessory is a headset comprising at least a first transducer configured to convert a first electrical signal into a first audible sound.

3. The charging arrangement of claim 2 wherein said electronic accessory further includes a second transducer configured to convert a second audible sound into a second electrical signal.

4. The charging arrangement of claim 3 wherein said portable electronic device represents a cellular phone.

5. The charging arrangement of claim 1 wherein said first regulation circuit is configured to provide a trickle charge to said electronic accessory after said electronic accessory is fully charged, said trickle charge being associated with a trickle current that is lower than a charging current employed to charge said electronic accessory when said electronic accessory is completely discharged.

* * * * *